(12) United States Patent
Liu

(10) Patent No.: US 11,451,416 B2
(45) Date of Patent: Sep. 20, 2022

(54) SIGNAL EQUALIZER AND SIGNAL EQUALIZING METHOD

(71) Applicant: Realtek Semiconductor Corp., HsinChu (TW)

(72) Inventor: Yao-Chia Liu, Hsinchu (TW)

(73) Assignee: Realtek Semiconductor Corp., HsinChu (TW)

( * ) Notice: Subject to any disclaimer, the term of this patent is extended or adjusted under 35 U.S.C. 154(b) by 259 days.

(21) Appl. No.: 16/987,378

(22) Filed: Aug. 6, 2020

(65) Prior Publication Data

US 2021/0211332 A1 Jul. 8, 2021

(30) Foreign Application Priority Data

Jan. 6, 2020 (TW) ................... 109100266

(51) Int. Cl.
*H04L 25/03* (2006.01)
(52) U.S. Cl.
CPC .. *H04L 25/03057* (2013.01); *H04L 25/03006* (2013.01); *H04L 25/03828* (2013.01)
(58) Field of Classification Search
CPC ......... H04L 25/03019; H04L 25/03006; H04L 25/03828
USPC ....................................... 375/233
See application file for complete search history.

(56) References Cited

U.S. PATENT DOCUMENTS

| | | | | |
|---|---|---|---|---|
| 2013/0044845 | A1* | 2/2013 | Zerbe | ..... H04L 7/0033 375/360 |
| 2017/0288665 | A1* | 10/2017 | Ali | ..... H03K 5/134 |

FOREIGN PATENT DOCUMENTS

EP 2 456 070 B1 9/2013

OTHER PUBLICATIONS

Stojanovic, Autonomous Dual-Mode (PAM2/4) Serial Link Transceiver With Adaptive Equalization and Data Recovery. IEEE J. Solid-State Circuits, vol. 40, No. 4, Apr. 2005.
Wong, Edge and Data Adaptive Equalization of Serial-Link Transceivers, IEEE Journal of Solid-State Circuits, vol. 43, No. 9, Sep. 2008.

\* cited by examiner

*Primary Examiner* — Leila Malek
(74) *Attorney, Agent, or Firm* — Winston Hsu

(57) ABSTRACT

A signal equalizer comprising: a feedback system, configured to acquire at least one signal value of an edge region of an input signal, and configured to adjust the signal value according to a crossing part of an eye diagram such that the crossing part converges to a zero point, wherein the crossing part corresponds to the edge region.

19 Claims, 8 Drawing Sheets

SIGNAL EQUALIZER AND SIGNAL EQUALIZING METHOD

BACKGROUND OF THE INVENTION

1. Field of the Invention

The present invention relates to a signal equalizer, and particularly relates to a signal equalizer which can adjust a transforming region of an input signal such that a crossing part of a corresponding eye diagram can converge to a zero point.

2. Description of the Prior Art

When a signal is transmitted, the waveform of the signal may be worse due to the effect of the signal channel or other noise. With the development of communication systems, the signal transmission speed is getting faster and faster, and the signal waveform will be more easily affected in this situation. The quality of the signal waveform can be determined according to an eye diagram of the signal. The eye diagram is a graph obtained by superimposing multiple samples of different parts of the signal after being sampled by a sampling clock signal. The clearer the eye part and the denser the line part distribution in the eye diagram, the better the signal waveform is. Conversely, the more unclear the eye part and the more scattered the line part, the worse the signal waveform is. Therefore, the signal can be adjusted by a signal equalizer according to the eye diagram to make the signal have a better waveform.

A conventional signal equalizer, such as a DFE (Decision Feedback Equalizer), uses LMS (least mean square) to calculate the average standard voltage of the upper and lower noise regions, and adjusts the signal accordingly. However, this method may limit the signal gain in order to avoid the signal saturation problem, and makes the overall signal amplitudes smaller.

SUMMARY OF THE INVENTION

One objective of the present invention is to provide a signal equalizer that improves the eye diagram without limiting the overall signal gain.

Another objective of the present invention is to provide a signal equalization method for improving the eye diagram without limiting the overall signal gain.

One embodiment of the present invention provides a signal equalizer, comprising: a feedback system, configured to acquire at least one signal value of an edge region of an input signal, and configured to adjust the signal value according to a crossing part of an eye diagram such that the crossing part converges to a zero point, wherein the crossing part corresponds to the edge region.

Another embodiment of the present invention provides a signal equalizing method comprising: acquiring at least one signal value of an edge region of an input signal; and adjusting the signal value according to a crossing part of an eye diagram such that the crossing part converges to a zero point, wherein the crossing part corresponds to the edge region.

In view of above-mentioned embodiment, the present invention can make the crossing part of the eye diagram converge to the zero point, thus can improve the eye diagram without limiting the overall signal gain.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
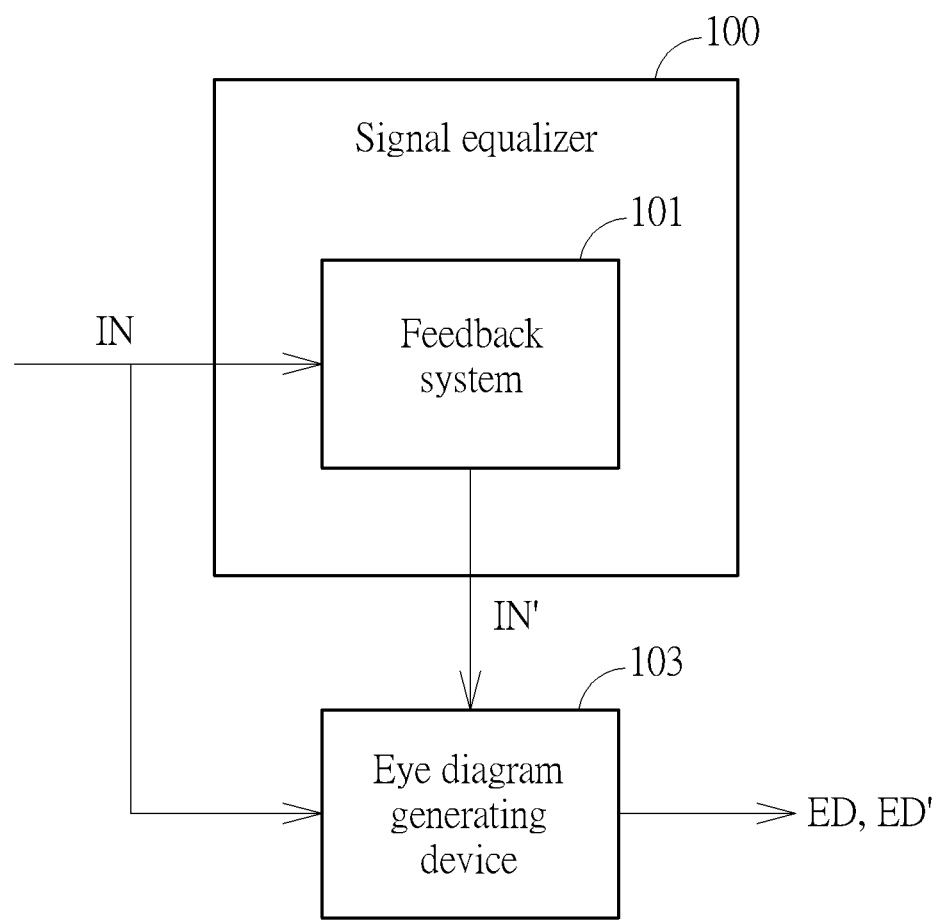
FIG. 1 is a block diagram illustrating a signal equalizer according to an embodiment of the present invention.
Figure 2:
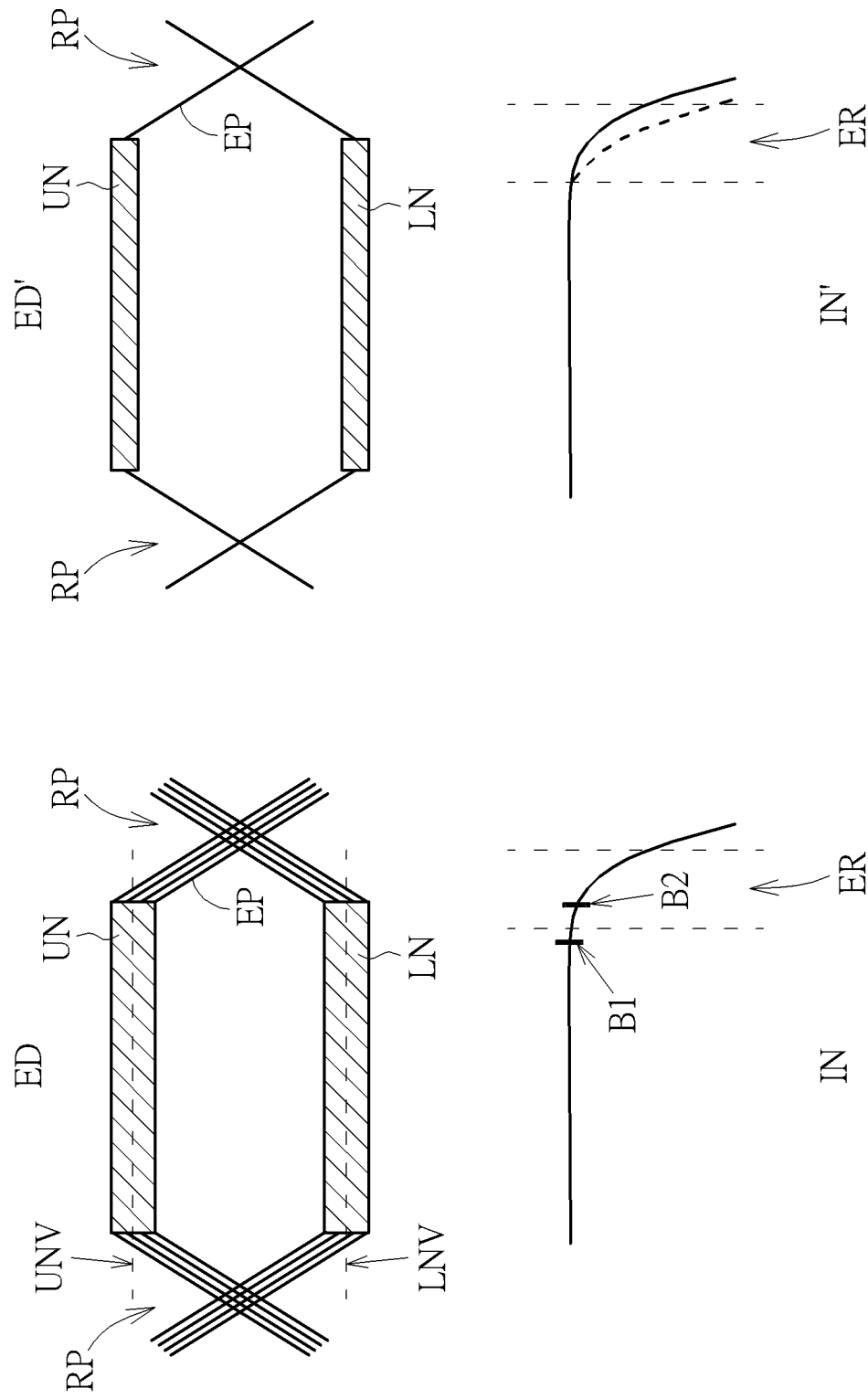
FIG. 2 is a schematic diagram showing the operations of the signal equalizer shown in FIG. 1.

FIG. 1 is a block diagram illustrating a signal equalizer according to an embodiment of the present invention. FIG. 2 is a schematic diagram showing the operations of the signal equalizer shown in FIG. 1. Please refer to FIG. 1 and FIG. 2 together to understand the content of the present invention. As shown in FIG. 1, the signal equalizer 100 comprises a feedback system 101 for sampling at least one signal value of an edge region ER of the input signal IN, and adjusts the signal value to generate an adjusted input signal IN' according to a crossing part of an eye diagram corresponding to the edge region. Such that the crossing part of the eye diagram, which is generated by the eye diagram generating device 103, converges toward a zero point (or named a crossing point). The input signal IN is a waveform from 1 to 0. The edge region ER can mean a signal transforming point of the input signal IN, or a region within a predetermined range of the signal transforming point. As shown in FIG. 2, the upper noise region UN, the lower noise region LN, and the crossing part RP of an eye diagram corresponding to the original input signal IN have relatively scattered waveform distribution, which indicates the input signal IN has a poor waveform. However, the waveform of the upper noise region UN, the lower noise region LN, and the crossing part RP of the eye diagram ED' is more concentrated (that is, the crossing part RP converges to the zero point), which indicates that the waveform of the adjusted input signal IN' is relatively good.

Since the crossing part RP of the eye diagram ED corresponds to the edge region ER of the input signal IN, the feedback system 101 adjusts the edge region ER of the input signal IN to make the crossing part RP converge to the zero point. In the embodiment of FIG. 2, the edge region ER of the input signal IN corresponds to the graphic part EP of the crossing portion RP in the eye diagram ED. Therefore, to make the graphic part EP converge to the zero point, the edge region ER of the input signal IN must be adjusted downward, as shown by the dashed line of the edge region ER in the input signal IN'. The other edge regions ER corresponding to the crossing part RP can also be adjusted according to the same rules. For example, if the waveform is from 0 to 1 and the graphic region EP is desired to converge to the zero point, the edge region ER must be adjusted upward instead of downward.

Figure 3:
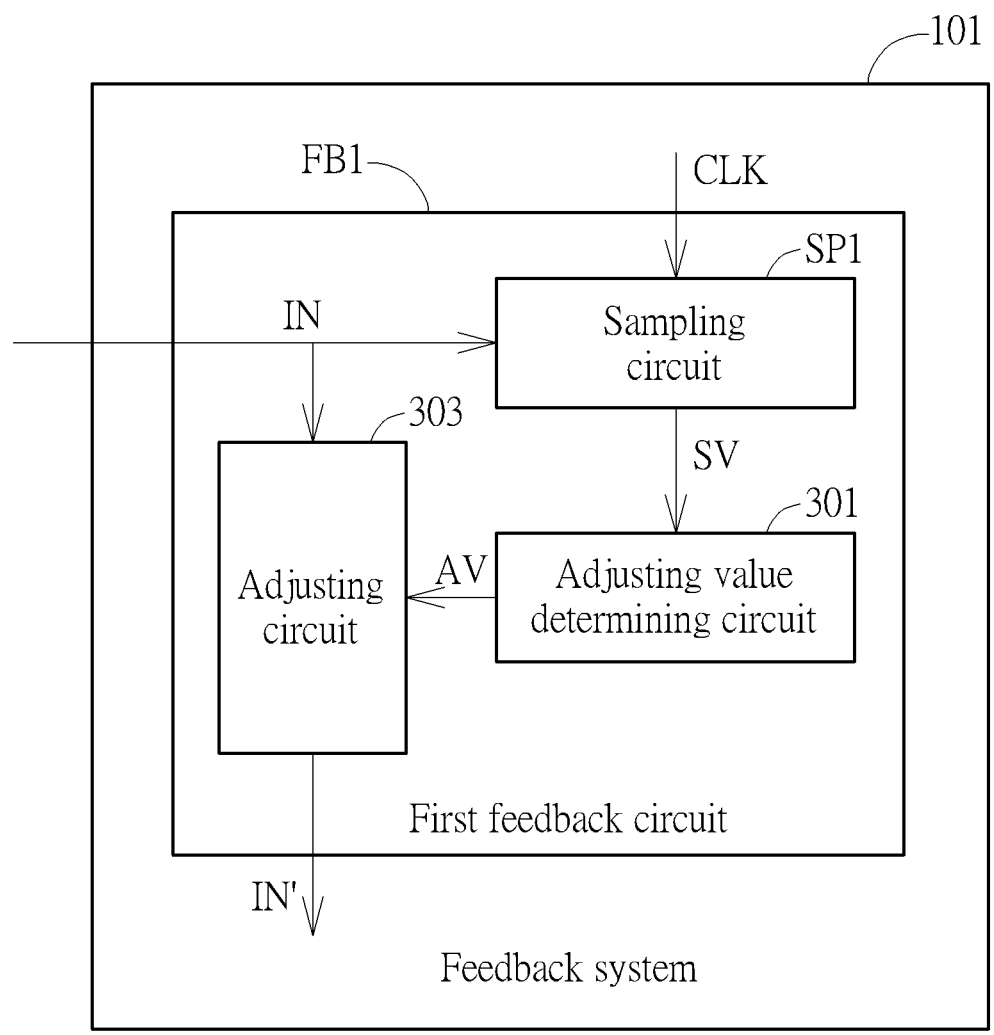
FIG. 3 and FIG. 4 show more detail block diagrams of the feedback system according to different embodiments of the present invention.
Figure 4:
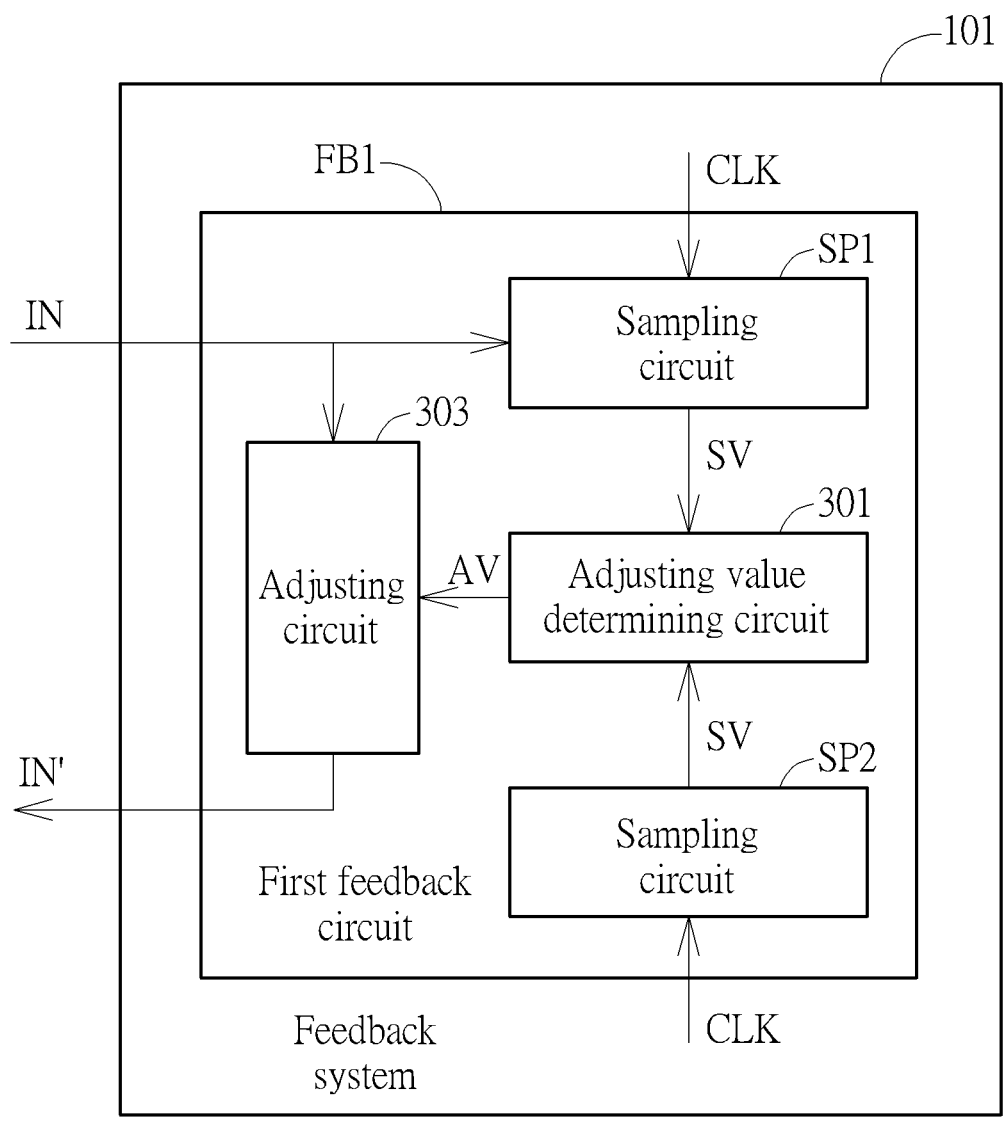

In following descriptions, the content of the present invention will be described by different embodiments, but please note that these embodiments are only examples, and do not mean to limit the present invention. FIG. 3 and FIG. 4 show more detail block diagrams of the feedback system according to different embodiments of the present invention. As shown in FIG. 3, the feedback system 101 comprises a first feedback circuit FB1, which comprises a sampling circuit SP1, an adjusting value determining circuit 301, and an adjusting circuit 303. The sampling circuit SP1 samples the above-mentioned edge region ER and the non-edge region (or named data region) with a sampling clock signal CLK to obtain at least a part of the signal value SV. The adjusting value determining circuit 301 determines an adjusting value AV according to the signal value SV and the crossing part RP. The adjusting circuit 303 is used to adjust the signal value SV according to the adjusting value AV, such that the crossing part RP of the eye diagram ED converges toward the zero point. For more detail, according to the signal value SV sampled by the sampling circuit SP1, it is possible to know the part where the input signal IN transforms, and then know the signal values SV which the edge region ER corresponds to. The adjusting value determining circuit 301 can determine whether the waveform of the edge region ER is to be adjusted upward or downward according to the crossing part RP of the eye diagram ED, and then determine the adjusting value AV.

The sampling circuit SP1 may use the sampling clock signal CLK to sample the aforementioned edge region ER to obtain the entire signal value SV, but may also use the sampling clock signal CLK to sample the aforementioned edge region ER to obtain only a portion of the signal Value SV. In the embodiment of FIG. 4, the first feedback circuit FB1 comprises another sampling circuit SP2 in addition to the sampling circuit SP1, the adjusting value determining circuit 301, and the adjusting circuit 303. In the embodiment of FIG. 4, the sampling circuit SP1 samples the edge region ER of the input signal IN with the first type of edges of the sampling clock signal CLK, and the sampling circuit SP2 uses the second type of edges of the sampling clock signal CLK to sample non-edge region of the input signal IN. In one embodiment, the first type of edges are positive edges and the second type of edges are negative edges.

Figure 5:
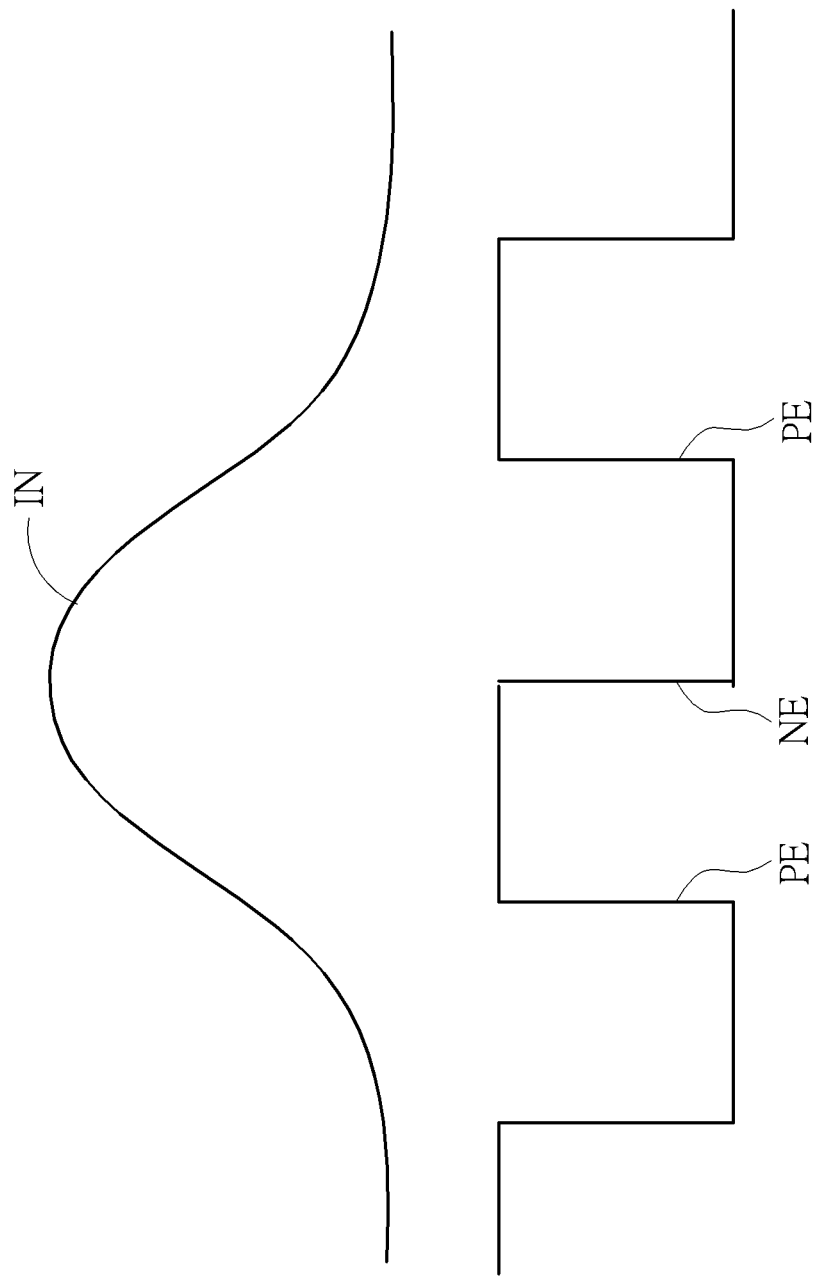
FIG. 5 is a schematic diagram showing the operations of the feedback system shown in FIG. 4.

FIG. 5 is a schematic diagram showing the operations of the feedback system shown in FIG. 4. As shown in FIG. 5, the sampling circuit SP1 samples the edge region ER of the input signal IN with the positive edge PE of the sampling clock signal CLK, and the sampling circuit SP2 samples the non-edge region of the input signal IN with the negative edge NE of the sampling clock signal CLK. Please note that for the convenience of illustration, only one of the positive edges and one of the negative edges are symbolized. The advantage of this is that if only one type of edge is used to sample the input signal IN, the clock signal CLK needs a relatively high frequency to obtain the required number of sample values. Moreover, if only one type of the edge is used to sample the input signal IN, the phase difference of each sampled signal value will be quite large, so it may not be possible to determine the correct adjusting value AV. In addition, if only one type of edge is used for sampling, as shown in FIG. 5, since the clock signal CLK frequency is not fast enough, the positive edge PE will sample in the edge region. For example, a negative edge NE is needed to sample in the non-edge region for the transforming part 01 and the transforming part 10 of a signal 010. The non-edge region here can be, for example, a data region 1 of the signal 010.

Figure 6:
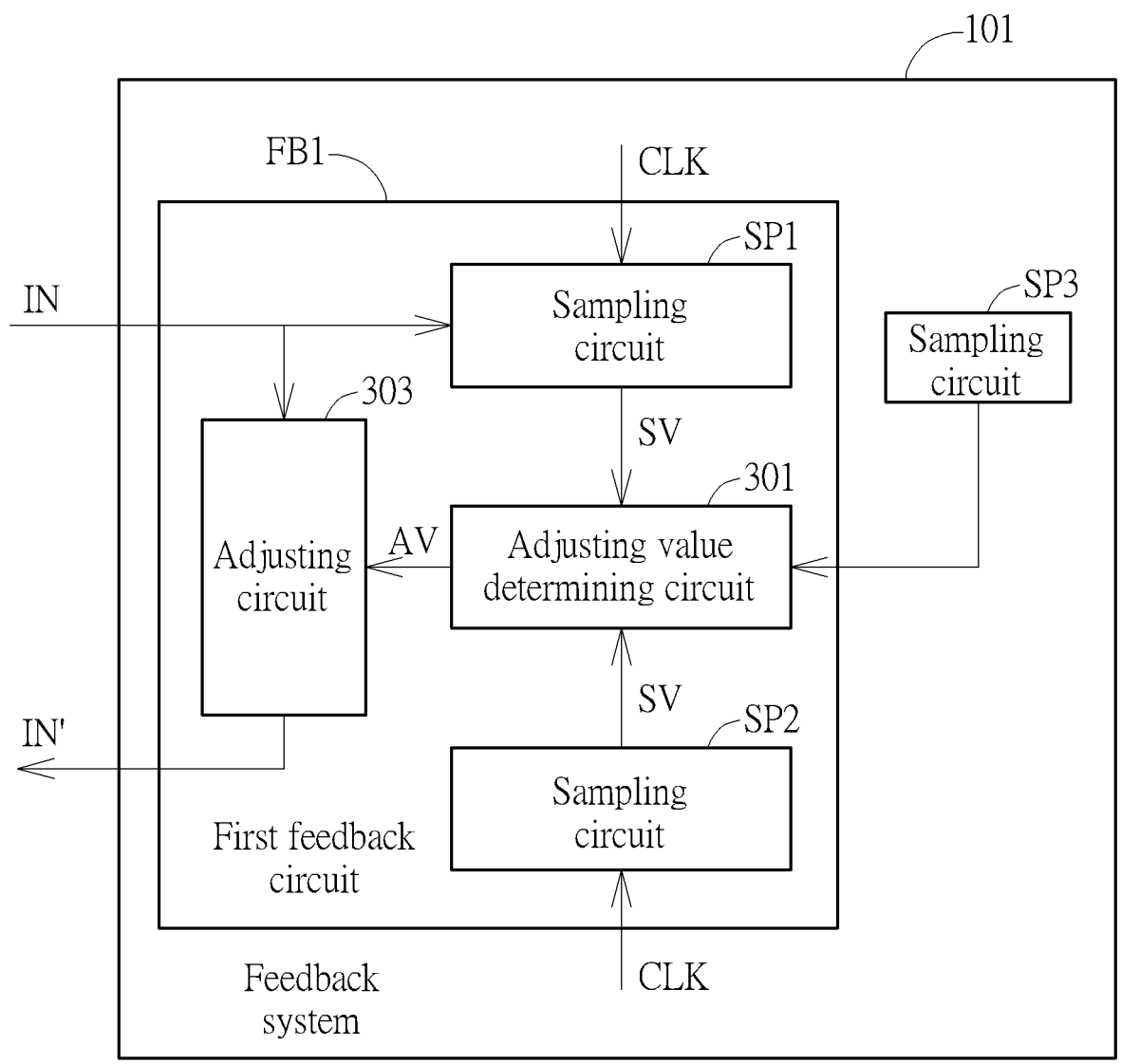
FIG. 6 shows a more detail block diagram of a feedback system according to another embodiment of the present invention.

FIG. 6 shows a more detail block diagram of a feedback system according to another embodiment of the present invention. In this embodiment, the feedback system 101 further comprises a second feedback circuit, and the second feedback circuit is used to adjust at least one signal part of the input signal, such that the eye diagram parts corresponding to the signal part converge to The average voltage in the upper noise region (such as UNV in FIG. 2) and the average voltage in the lower noise region (such as LNV in FIG. 2). In one embodiment, this signal part is a non-edge region of the input signal IN, such as B1 shown in FIG. 2, which is a previous bit of the edge region ER. In the embodiment of FIG. 6, the feedback system 101 comprises a sampling circuit SP3, which form the aforementioned second feedback circuit with the adjusting value determining circuit 301, the adjusting circuit 303. That is, the second feedback circuit can share the adjusting value determining circuit 301 and the adjusting circuit 303 with the first feedback circuit. However, the adjusting value determining circuit and the adjusting circuit of the second feedback circuit may be independent from the adjusting value determining circuit and the adjusting circuit of the first feedback circuit.

Figure 7:
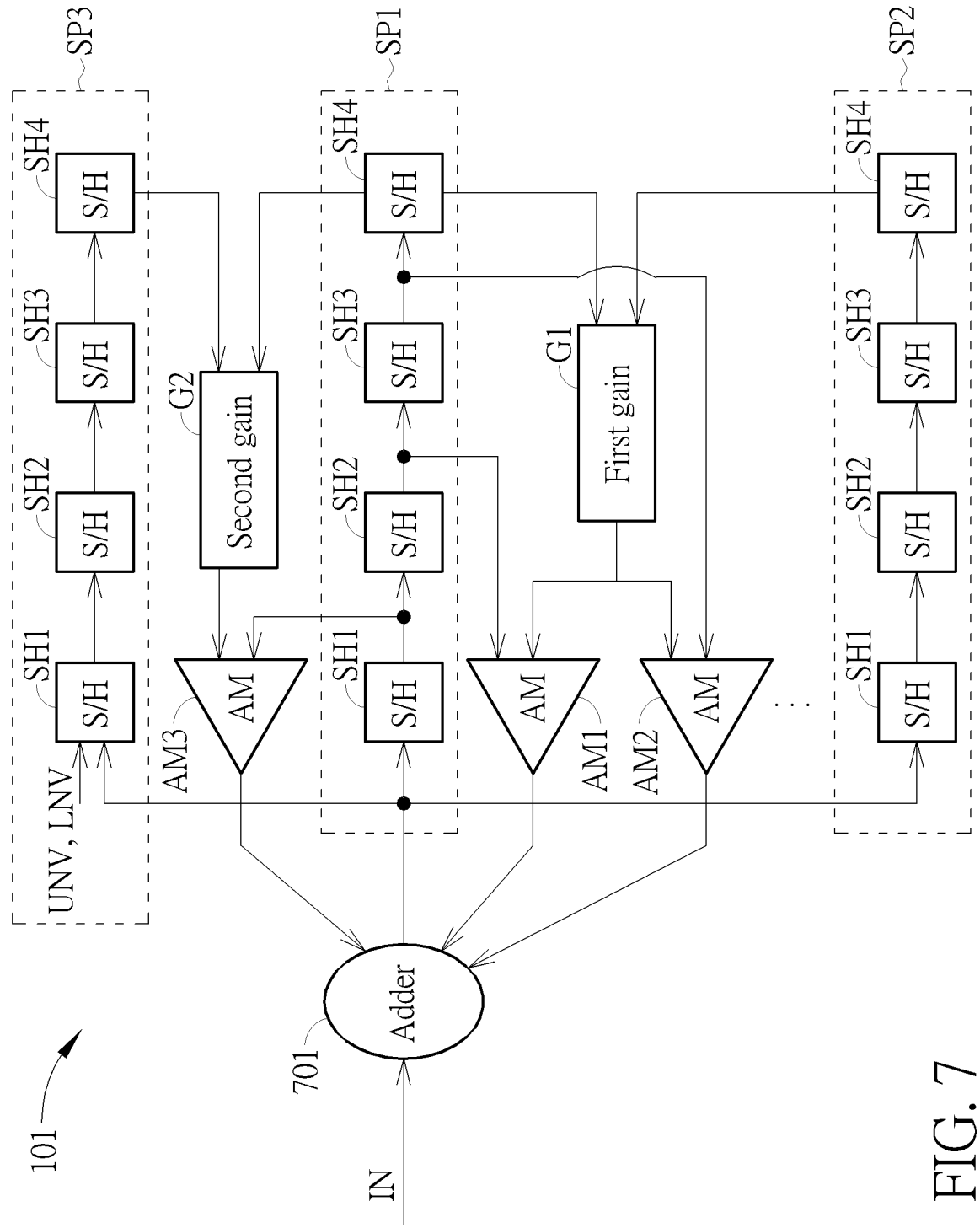
FIG. 7 is a detail circuit diagram of the feedback system of FIG. 6 according to one embodiment of the present invention.

FIG. 7 is a detail circuit diagram of the feedback system of FIG. 6 according to one embodiment of the present invention. Please note, however, that the circuit shown in FIG. 7 is for illustration only, and it may have different circuit structures due to different used algorithms. In addition, persons skilled in the art can also achieve the same function with other circuit structures according to the aforementioned teachings, and such variations should falls within the scope of the present invention. As shown in FIG. 7, the sampling circuits SP1, SP2, and SP3 respectively comprise sample and hold circuits (SH1, SH2, SH3, . . . ) coupled in series. In the embodiment of FIG. 7, the sampling circuit SP1 is used to sample the non-edge region (or named data region), and the sampling circuit SP2 is used to sample the edge region. The adjusting value determining circuit 301 in FIG. 6 comprises a first gain value determining circuit G1 and a second gain value determining circuit G2 in FIG. 7. In addition, the adjusting circuit 303 in FIG. 6 comprises a plurality of amplifiers AM1, AM2, AM3, . . . , and an adder 701. The sampling circuits SP1, SP2, the first gain value determining circuit G1, and the amplifiers AM1, AM2 form the aforementioned first feedback circuit, and the sampling circuits SP3, the second gain value determining circuit G2, and the amplifier AM3 form the aforementioned second feedback circuit. Since the first feedback circuit and the second feedback circuit share the amplifier AM3, the amplifier AM3 can be regarded as a shared amplifier. The first gain value determining circuit G1 and the second gain value determining circuit G2 can be implemented in various ways. For example, a microprocessor can be used to execute a predetermined program to achieve its function. For another example, the first gain value determining circuit G1 and the second gain value determining circuit G2 may be circuits including various logic gates, which may receive the outputs of other circuits to achieve the functions of the combination of logic gates.

The sample and hold circuits SH1, SH2, and SH3 of the sample circuits SP1 and SP2 sample different bits of the input signal IN, and the outputs of the sample and hold circuits SH2 and SH3 of the sample circuits SP1 are output to the amplifiers AM1 and AM2, respectively. For example, the sample-and-hold circuit SH1 of the sampling circuit SP1 outputs the bit B1 in FIG. 2 and the sample-and-hold circuit SH1 of the sampling circuit SP2 outputs the bit B2 in FIG. 2. Also, the sample-and-hold circuit SH2 of the sampling circuit SP1 outputs the next bit of the bit B2 . . . and so on. In the embodiment of FIG. 7, the outputs of the sample-and-hold circuits SH4 of the sampling circuits SP1 and SP2 are output to the first gain value determining circuit G1. The first gain value determining circuit G1 determines the gain values of the amplifiers AM1 and AM2 according to the outputs of the sample-and-hold circuit SH4. However, please note that corresponding to different algorithms, the first gain value determining circuit G1 may receive other stages of sample-and-hold circuits of the sampling circuits SP1 and SP2 to determine the gain value, and is not limited to the output of the last stage of sample and hold circuit.

As above-mentioned, the second feedback circuit is used to converge the eye diagram to the average voltage UNV of the upper noise region and the average voltage LNV of the lower noise region. Therefore, in the embodiment of FIG. 7, the sampling circuit SP3 will receive the average voltage UNV in the upper noise region and the average voltage LNV in the lower noise region, and the output of the last stage sample and hold circuit SH4 will be received by the second gain value determining circuit G2. The amplifier AM3 receives the output of the second gain value determining circuit G2, receives the output from the first stage sample and hold circuit SH1 of the sampling circuit SP1 (the bit B1 of the input signal IN in FIG. 2), and accordingly adjust the bit B1 of the input signal IN. That is, in one embodiment, the second feedback circuit can adjust the first signal value of the input signal IN, which is first sampled.

The signal values amplified by the amplifiers AM1, AM2, and AM3 are output to the adder 701 and are summed up with the input signal IN, that is, are fed back to the input signal IN to form the aforementioned input signal IN'. However, please note that the number of amplifiers in the embodiment of FIG. 7 is not limited to three, and the number of sample and hold circuits is not limited to four. Persons skilled in the art can adjust the number of amplifiers or sample and hold circuits according to different requirements. In one embodiment, the input signal input to the adder 701 is first processed by an analog equalizer, such that the input signal IN is processed by preliminary waveform optimization, and then the feedback system 101 processes the optimized input signal IN.

Figure 8:
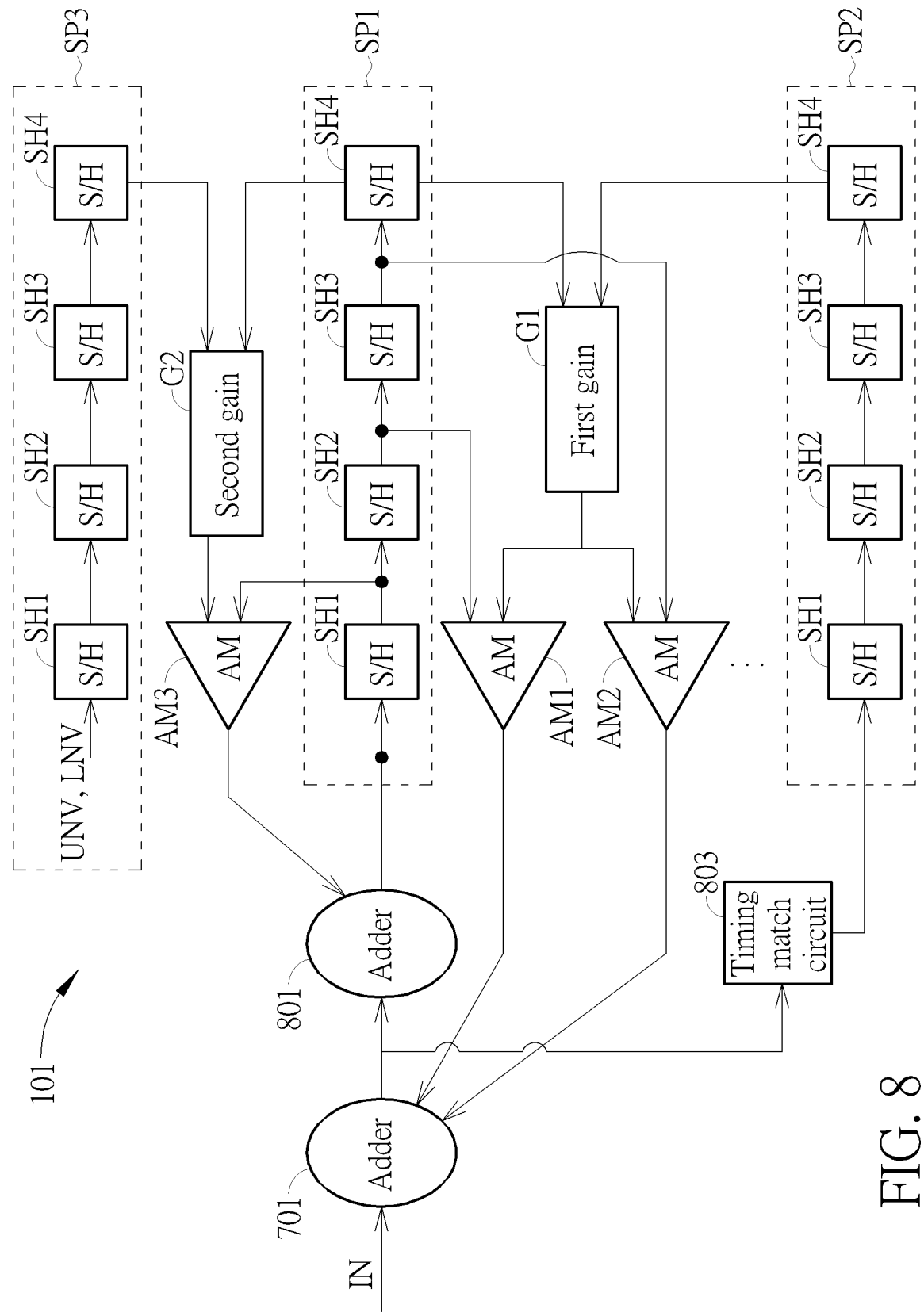
FIG. 8 is a detail circuit diagram of the feedback system of FIG. 6 according to another embodiment of the present invention.

FIG. 8 is a detail circuit diagram of the feedback system of FIG. 6 according to another embodiment of the present invention. In the embodiment of FIG. 8, the sampling circuit SP1 is used for sampling the non-edge region (data region), and the sampling circuit SP2 is used for sampling the edge region. One difference between the embodiment shown in FIG. 7 and the embodiment shown in FIG. 8 is that the embodiment shown in FIG. 8 comprises another adder 801. Also, in the embodiment shown in FIG. 8, the amplifier AM3 is output to the adder 801 instead of the adder 701. The advantage of such method is that since the sampling circuit SP3 samples in a non-edge region and the second feedback circuit is used to make the eye diagram part converge to the average voltage UNV and the average voltage LNV, the output of the amplifier AM3 may affect the action of "converging the crossing part of the eye diagram toward the zero point". Therefore, letting the amplifiers AM1 and AM2 use the same adder 701 and letting the amplifier AM3 use another adder 801 can improve the adjustment of the input signal.

In one embodiment, the embodiment of FIG. 8 further comprises a timing match circuit 803, which is coupled to the output of the adder 701 and the input of the sampling circuit SP2 to make the inputs of the sampling circuits SP1, SP2, and SP3 can match with each other. Since the sampling circuits SP1 and SP3 both sample the non-edge region and pass through the adders 701 and 801, and the sampling circuit SP2 samples the edge region and only pass through the adder 701, the delay conditions of the inputs of the sampling circuits SP1, SP2, and SP3 may be different. Therefore, the timing match circuit 803 is required to make the input timings of the sampling circuits SP1, SP2, and SP3 match with each other. The matching circuit 803 may be a delay circuit or an adder having the same circuit structure as the adder 701 or 801.

According to the above-mentioned embodiments, a signal equalizing method can be obtained, which comprises a signal feedback method, and the signal feedback method comprises: acquiring at least one signal value of an edge region ER of an input signal IN (e.g. FIG. 2); and adjusting the signal value according to a crossing part of an eye diagram such that the crossing part converges to a zero point, wherein the crossing part corresponds to the edge region. Other detail steps have been disclosed in the foregoing embodiments, so they are not repeated here.

In view of above-mentioned embodiment, the present invention can make the crossing part of the eye diagram converge to the zero point, thus can improve the eye diagram without limiting the overall signal gain.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A signal equalizer, comprising:
a feedback system, configured to acquire at least one signal value of an edge region of an input signal, and configured to adjust the signal value according to a crossing part of an eye diagram such that the crossing part converges to a zero point, wherein the crossing part corresponds to the edge region.

2. The signal equalizer of claim 1, wherein the feedback system comprises a first feedback circuit comprising:
a first sampling circuit, configured to acquire at least portion of the signal value by sampling a non-edge region of the input signal according to a first type of edge of a sampling clock signal;
an adjust value determining circuit, configured to determine at least one first adjusting value according to the signal value and the crossing part; and
an adjusting circuit, configured to adjust the edge region according to the first adjusting value, such that the crossing part converges to the zero point.

3. The signal equalizer of claim 2, wherein the first feedback circuit further comprises:
a second sampling circuit, configured to acquire another portion of the signal value by sampling the edge region of the input signal according to a second type of edge of the sampling clock signal.

4. The signal equalizer of claim 2, wherein the feedback system comprises a second feedback circuit configured to adjust at least one signal part of the input signal, such that an eye diagram part corresponding to the signal part converges to an upper noise region average voltage and a lower noise region average voltage.

5. The signal equalizer of claim 4, wherein the signal part is a first signal value of the input signal, wherein the first signal value is a signal value first sampled by the sampling clock signal.

6. The signal equalizer of claim 4, wherein the signal part is a non-edge region of the input signal.

7. The signal equalizer of claim 4, wherein the signal part is a previous bit of the edge region.

8. The signal equalizer of claim 4,
wherein the first feedback circuit comprises the first sampling circuit and a plurality of amplifiers;
where the second feedback circuit generates a second adjusting value according to the upper noise region average voltage and the lower noise region average voltage;
wherein the first sampling circuit comprises a plurality of sample and hold circuits coupled in series; and
where one shared amplifier among the amplifies receives the second adjusting value and an output of a first one of the sample and hold circuits to adjust the signal part.

9. The signal equalizer of claim 8, comprising an adder, wherein the amplifiers output to the adder.

10. The signal equalizer of claim 8, comprising two adders;
wherein the shared amplifier outputs to one of the adders, and the amplifier which is not the shared amplifier outputs to the other one of the adders.

11. A signal equalizing method, comprising:
acquiring at least one signal value of an edge region of an input signal; and
adjusting the signal value according to a crossing part of an eye diagram such that the crossing part converges to a zero point, wherein the crossing part corresponds to the edge region.

12. The signal equalizing method of claim 11, comprising:
acquiring at least portion of the signal value by sampling a non-edge region of the input signal according to a first type of edge of a sampling clock signal;
determining at least one first adjusting value according to the signal value and the crossing part; and
adjusting the edge region according to the first adjusting value, such that the crossing part converges to the zero point.

13. The signal equalizing method of claim 12, wherein the first adjusting value is a gain value, wherein the step of adjusting the signal value comprising using the gain value to amplify the signal value.

14. The signal equalizing method of claim 12, further comprising:
acquiring another portion of the signal value by sampling the edge region of the input signal according to a second type of edge of the sampling clock signal.

15. The signal equalizing method of claim 14, wherein the first type of edge is a positive edge and the second type of edge is a negative edge.

16. The signal equalizing method of claim 12, further comprising:
adjusting at least one signal part of the input signal, such that an eye diagram part corresponding to the signal part converges to an upper noise region average voltage and a lower noise region average voltage.

17. The signal equalizing method of claim 16, wherein the signal part is a first signal value of the input signal, wherein the first signal value is a signal value first sampled by the sampling clock signal.

18. The signal equalizing method of claim 16, wherein the signal part is the non-edge region of the input signal.

19. The signal equalizing method of claim 18, wherein the signal part is a previous bit of the edge region.

* * * * *